April 15, 1941.                H. SMALL                    2,238,453
               FLASH BULB FIRING MECHANISM FOR CAMERAS
                   Filed Sept. 7, 1939         4 Sheets-Sheet 1
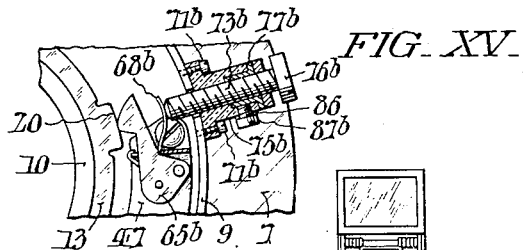
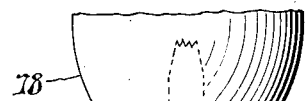
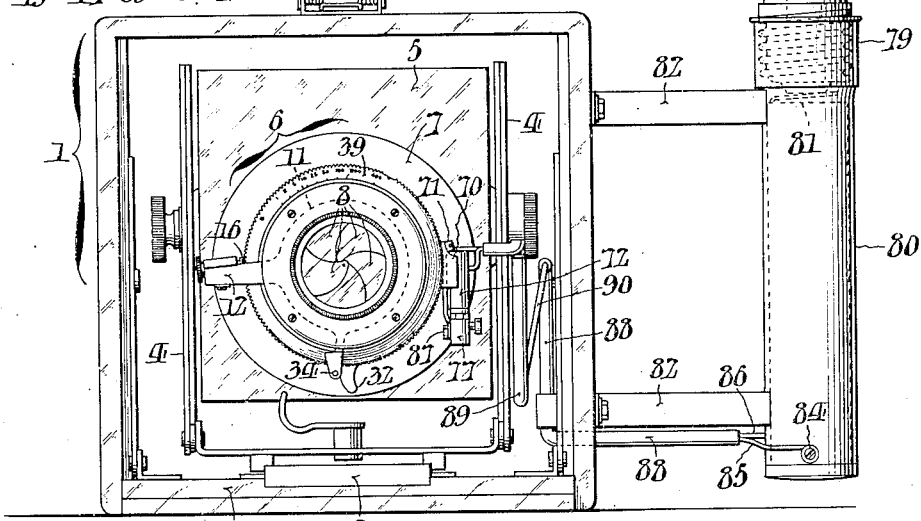
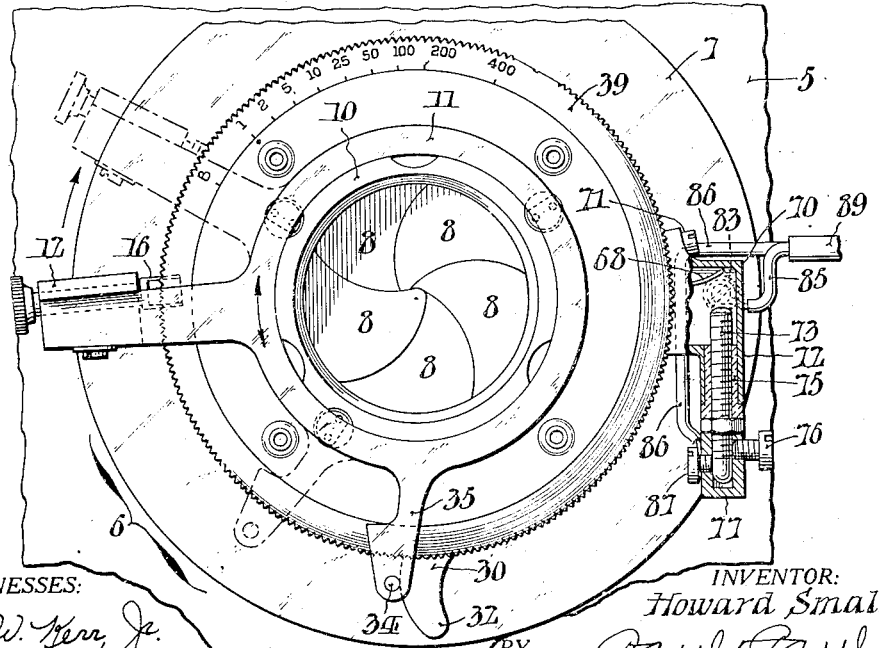
WITNESSES:                                      INVENTOR:
                                              Howard Small,
                                          BY
                                                ATTORNEYS.

April 15, 1941.　　　　　H. SMALL　　　　　2,238,453
FLASH BULB FIRING MECHANISM FOR CAMERAS
Filed Sept. 7, 1939　　　4 Sheets-Sheet 2
FIG. III.
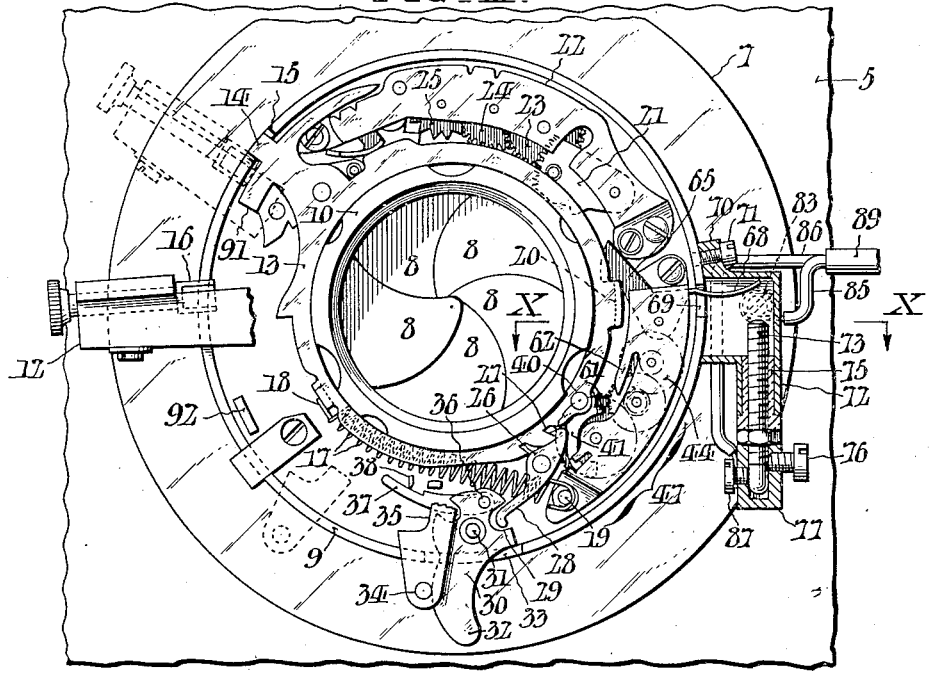
FIG. IV.
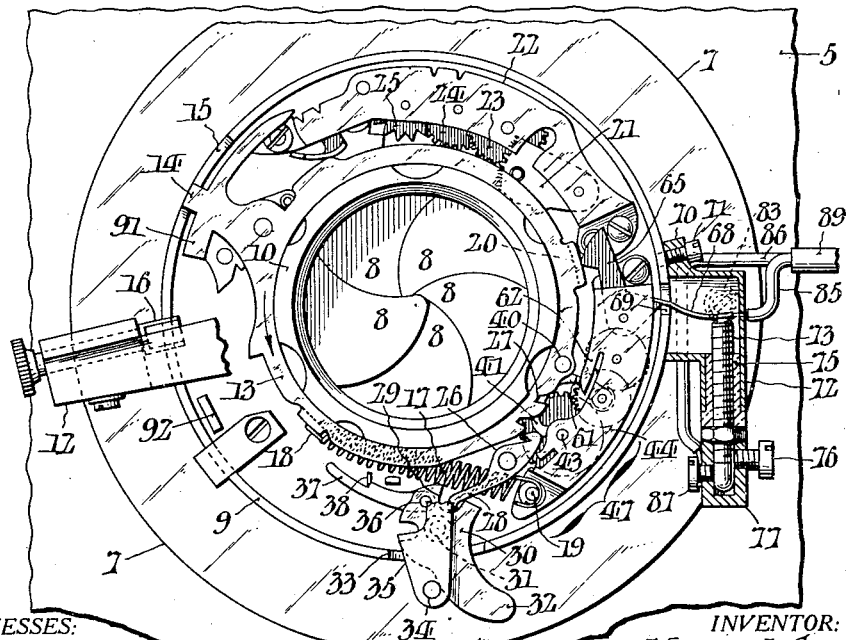
WITNESSES:
Thomas W. Kerr Jr.
George L. Combs
INVENTOR:
Howard Small,
BY
ATTORNEYS.

April 15, 1941.  H. SMALL  2,238,453
FLASH BULB FIRING MECHANISM FOR CAMERAS
Filed Sept. 7, 1939  4 Sheets-Sheet 3
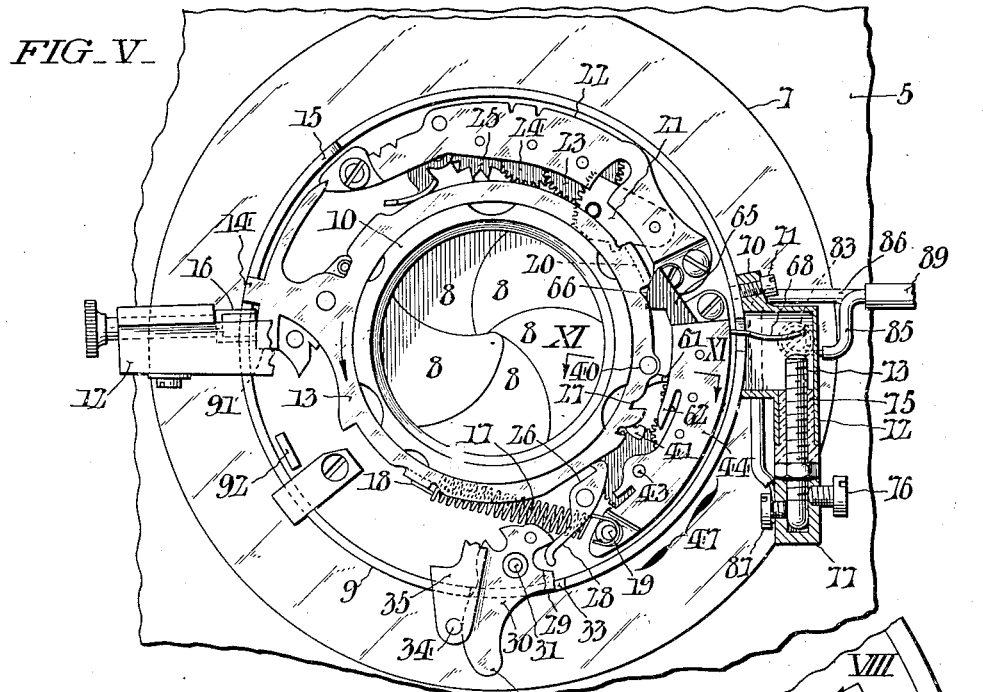
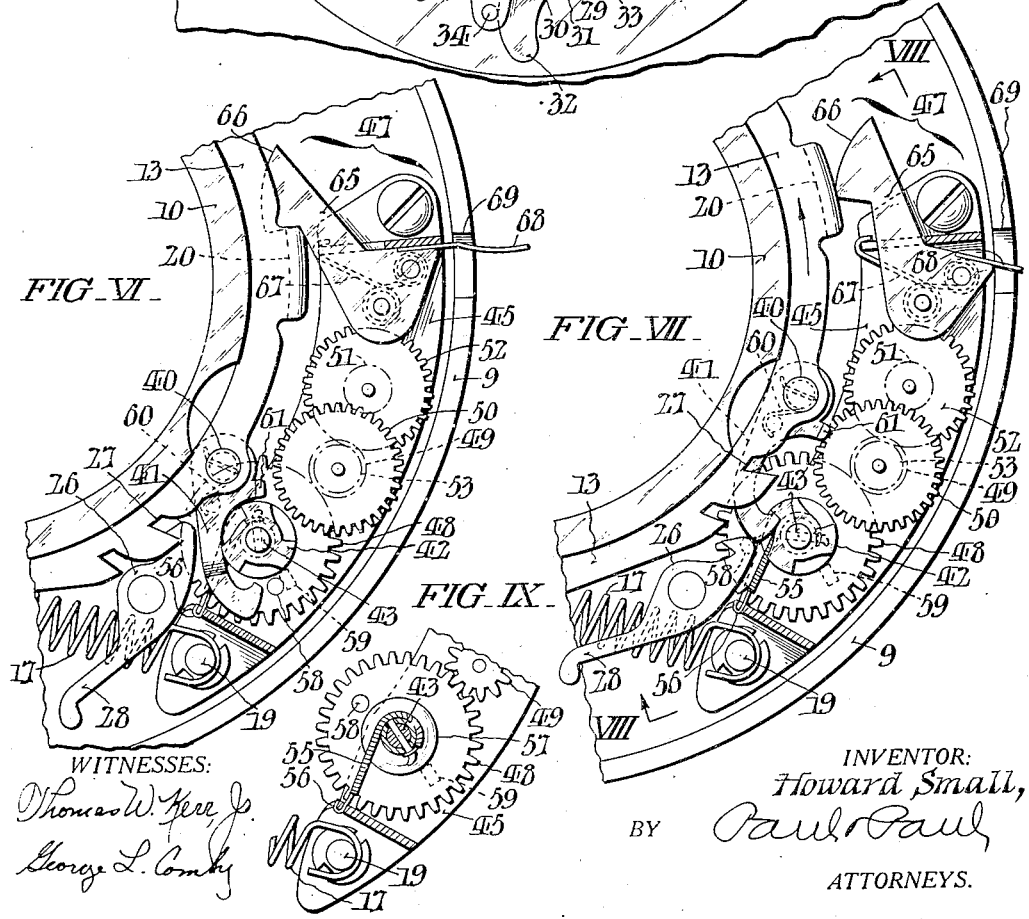
WITNESSES:
INVENTOR:
Howard Small,
BY
ATTORNEYS.

April 15, 1941.   H. SMALL   2,238,453
FLASH BULB FIRING MECHANISM FOR CAMERAS
Filed Sept. 7, 1939   4 Sheets-Sheet 4
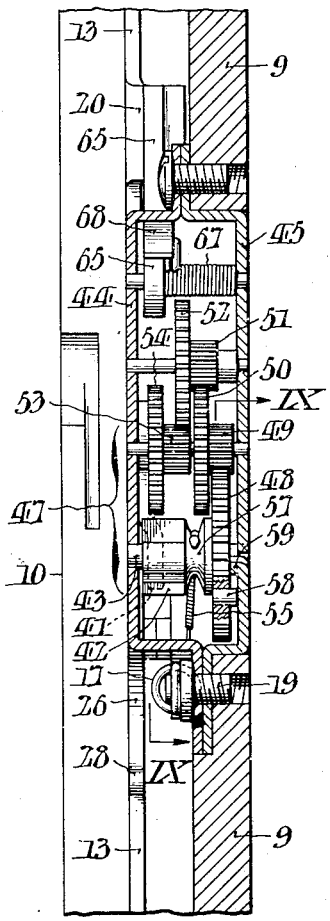
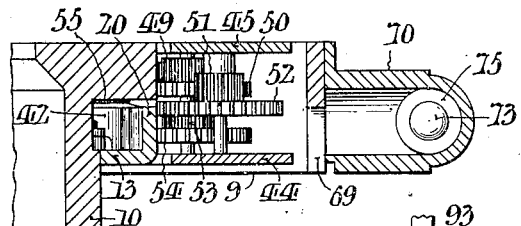
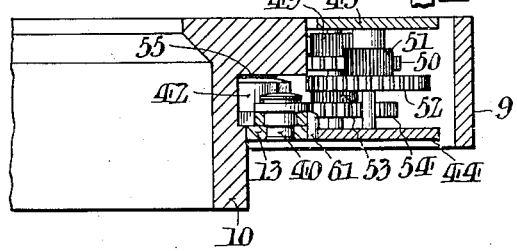
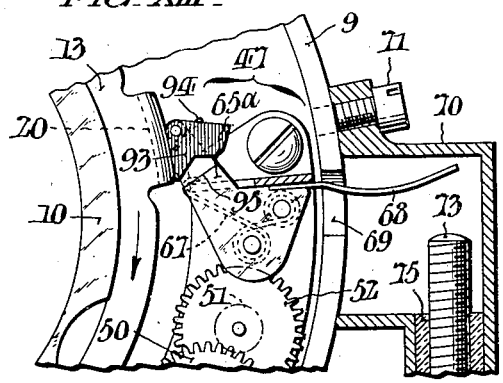
WITNESSES:
Thomas W. Kerr, Jr.
George L. Conley
INVENTOR:
Howard Small,
BY Paul & Paul
ATTORNEYS.

Patented Apr. 15, 1941

2,238,453

UNITED STATES PATENT OFFICE 2,238,453

FLASH BULB FIRING MECHANISM FOR CAMERAS

Howard Small, Philadelphia, Pa.

Application September 7, 1939, Serial No. 293,755

9 Claims. (Cl. 67—29)

This invention relates to mechanism useful in connection with cameras for the purpose of firing flash bulbs to furnish artificial light for picture taking.

My invention has for its primary aim to secure greater accuracy in synchronism between the actuation of the shutter of a camera and the firing of the flash bulb than is possible of attainment with existing devices designed for the purpose, in order that the exposure may be made to occur exactly at the moment when the actinic intensity of the light flash is at its maximum irrespective of the speed of operation for which the shutter is set. This desideratum I attain in practice as hereinafter more fully disclosed, through provision of a simple and reliable automatic mechanism which is actuated from the master control element of the camera shutter mechanism and which includes a circuit closing means, and a mean whereby the movement of the master control element is retarded to delay shutter operation after the actuation of the circuit closing means, for an interval sufficient for burning of the filament and the ignition of the illuminating material within the flash bulb.

Another object of my invention is to provide, in flash bulb firing mechanism having the above attributes, adjustment means whereby the delay interval may be regulated to compensate for differences in the characteristics of the lens shutters and/or of different types and makes of flash bulbs.

Another object of my invention is to secure the foregoing advantages in a flash bulb firing mechanism which is compact and which can be accommodated within the casing of the camera shutter, and which does not affect the normal operation of the shutter mechanism.

Other objects and attendant advantages will appear from the following detailed description of the attached drawings, wherein Fig. I is a view in front elevation of a camera conveniently embodying my improved bulb flashing mechanism.

Fig. II is a larger scale view, of the optical unit of the camera with the front cover plate of the lens shutter casing removed, and with a portion of the flashing mechanism shown in section.

Fig. III is a view generally similar to Fig. II, with more of the front of the main section of the lens shutter casing removed to better show the shutter actuating mechanism as well as the flashing mechanism within it.

Figs. IV and V are views like Fig. III showing the parts in the successively different positions which they assume incident to shutter operation.

Figs. VI and VII are fragmentary detail views on a still larger scale corresponding generally to Figs. III and IV and showing the flash control mechanism to better advantage.

Fig. VIII is a fragmentary detail sectional view taken in the circumferential plane indicated by the angled arrows VIII—VIII in Fig. VII.

Fig. IX is a fragmentary detail sectional view taken as indicated by the arrows IX—IX in Fig. VIII.

Fig. X is a fragmentary detail cross sectional view taken as indicated by the arrows X—X in Fig. III.

Fig. XI is a fragmentary detail sectional view taken as indicated by the arrows XI—XI in Fig. V.

Fig. XII is a view corresponding to Figs. III and VI and showing a slight modification of my invention.

Fig. XIII is like Fig. XII with the parts in different positions.

Fig. XIV is a fragmentary detail sectional view taken as indicated by the arrows XIV—XIV in Fig. XII; and Fig. XV is a view like Fig. XII showing another modification.

The camera which I have shown in Fig. I for convenience of exemplifying my invention, is of the bellows type, its housing being designated by the numeral 1 and its drop front by the numeral 2. Confined for longitudinal sliding movement in the drop front 2 is a slide 3 with a yoke frame 4 that pivotally supports the front plate 5 of the bellows whereon is mounted the lens shutter unit 6 which is generally of the construction of U. S. Patent No. 1,687,123 granted to Friederich Dekel and Martin Geiger on October 9, 1928. Enclosed within the large section 7 of the shutter casing is suitable means for actuating the usual overlapping segments 8 of the iris shutter, but since this mechanism, per se, does not constitute any part of my invention, detailed illustration or description thereof has not been deemed necessary. Extending axially forward through the smaller section 9 of the shutter casing is the lens barrel 10 whereon is mounted, at the forward end, a priming means in the form of a rotatively shiftable annulus 11, (see Fig. II), which has an actuating lever 12 whereby the shutter mechanism may be set in readiness for operation as later on explained. Similarly mounted on the lens barrel 10 rearwardly of the annulus 11 and within the smaller section 9 of the shutter casing is another rotatively shiftable annulus 13 which has a radial projection 14 extending into a segmental slot 15 in said casing. As shown, the projection 14 lies in the path of a lug 16 on the actuating lever 12 of the annulus 11. The annulus 13 constitutes the master control element of the shutter mechanism, and is subject to a helical tension spring 17 which tends to rotate it counter-clockwise in Figs. III–VI, one end of said spring being secured directly to the annulus at 18 and the other end being hooked over a fixed anchorage 19. As shown in Figs. III–V, the annulus 13 is provided with a rearwardly extending lug 20, which, as said annulus is moved counter-clockwise, engages the gear sector 21 of the shutter timing means 22 in the upper part of the casing. Through a train of gears whereof two are shown at 23, 24, the movement of the sector 21 is communicated to the escapement 25 of the timing means in a well-known manner. As the annulus 13 is shifted clockwise to set the shutter mechanism, a spring influenced hook detent 26 automatically engages a notch 27 in said annulus as shown in Fig. VI to temporarily hold it against return movement under the action of the spring 17, said detent having a tail 28 engaged within the notch 29 of a trip member 30 which is pivoted at 31 within the shutter casing section 9. As shown, the trip member 30 has a finger 32 extending outward through a peripheral slot 33 in the casing section 9 and lying in the path of a stud 34 on a radial arm 35 of the annulus 11, see Fig. III. Pivoted to the trip member 30 at 36 (Figs. III and IV) is a finger 37 with a notch engaged by a projection 38 which extends into the larger casing portion 7 to operate the shutter vane 8 for time and bulb exposures in the manner described in the Dekel et al. patent hereinbefore referred to. The graduated ring shown at 39 in Figs. I and II is for the purpose of adjusting the shutter for operation at different speeds as well understood in the art.

In adapting my invention to a camera such as briefly described up to this point, I have provided means as follows: Pivoted at 40 on the annulus 13 is a hook pawl 41 arranged to cooperate with a notched wheel 42 on an arbor 43 supported for rotation at its ends in the front and rear plates 44 and 45 of the arcuate bearing frame of a flash timing means 46 removably secured within the casing section 9. Affixed to the arbor 43 of the ratchet wheel 42 is a spur gear 48 which transmits motion to a train of gears 49, 50, 51, 52, 53 and 54 (Figs. VIII and X), whereof the arbors are also journalled in the bearing frame. A helical spring 55 with one of its ends anchored at 56 to the frame and the other wrapped around the spool hub 57 of the ratchet wheel 42, tends to rotate the gear wheel 48 anti-clockwise as later on explained, such movement of said gear being limited by engagement of a stud 58 thereon with a fixed stop 59 in the rear plate 45 of said frame. The hook pawl 41 is urged toward the ratchet 42 by means of a torsion spring 60, and the swing of said pawl is limited by a lug 61 thereon which is adapted to ride the edge of an arcuate guide tongue 62 on the outer plate 44 of the bearing frame when the annulus 13 is rotatively shifted clockwise to set the shutter mechanism.

In the upper end of the bearing frame is pivoted a dog 65 with a beveled cam end 66 to cooperate with the lug 20 on the annulus 13, toward which said dog is urged by a torsion spring 67, see Figs. VI and VII. As shown, the dog 65 has a spring tail 68 which extends outward through an aperture 69 in the periphery of the shutter casing section 9 and into the top of a small switch housing 70 secured by one or more screws such as shown at 71, to the side of the shutter casing. Axially within a pendant tubular projection 72 of the switch housing 70 is a screw 73 adapted to be contacted by the spring tail 68 of the dog 65. As shown, the screw 73 passes through a bushing 75 of insulation and is thus free of metallic contact with the switch housing as well as with the shutter casing. To the lower projecting end of the contact screw 73 is affixed by means of a set screw 76, a terminal cap 77.

The flash bulb shown at 78 in Fig. I, is screwed into a socket 79 at the top of a tubular receptacle 80 containing a dry battery 81 whereof one terminal is grounded to the receptacle, which latter is supported at one side of a camera housing 1 by a pair of vertically-spaced brackets 82. From a terminal screw 83 Fig. II, which engages into the back of the shutter casing to a terminal screw 84 engaging into the battery receptacle 80 at the bottom, is a current conductor 85. Another current conductor 86 which is connected at one end to a terminal screw 87 engaging into the side of the end cap 77 on the contact screw 73, forms the other side of a circuit through the battery 81 and the bulb 78. This circuit is normally open when the tail 68 of the dog 65 withdraws from the contact screws 73 as shown in Figs. II–V. From Fig. I it will be observed that the conductors 85 and 86 are suitably supported by sheathing tubes 88 and 89 respectively on the camera housing 1 and on the bellows front 5 with provision of ample intervening slack at 90 to allow for bellows movement, and for accommodation within the confines of said housing when the bellows is collapsed.

The operation of my invention is as follows:

Before the flash bulb 78 is placed in the socket 79, the lens shutter mechanism is set as ordinarily by moving the actuating lever 12 upward from the position shown in full lines in Figs. I, III and V to the position shown in dotted lines in Fig. III, with attendant impartation of a clockwise shift to the annulus 13. This shift of the annulus is limited by engagement of its projection 14 with the upper end of the arcuate slot 15 of the shutter casing, and incident thereto, the annulus 13, is locked in the position shown in Figs. III and VI through engagement of the hook detent 26 with the notch 27. Also, at the same time the lug 20 on the annulus in passing the finger 65 causes movement of the latter without production of any useful purpose, however. Upon being released, the actuating lever 12 will swing back under its own weight, as ordinarily, to its normal position with the stud 34 on the arm 35 of the annulus 11 resting against the curved finger projection 32 of the trip 30. With the foregoing accomplished, the bulb 78 is placed in the socket 79 at the top of the battery receptacle 80 and the camera thus made ready for picture taking.

When the picture is to be taken, the actuating lever 12 is depressed from the position shown in Figs. I–III to that shown in Fig. IV, with attendant tripping of the latch 30 by the stud 34 on the arm 35 of the annulus 11, this movement of said lever being limited by engagement of a stop projection 91 on the annulus 13 with a fixed stop 92 within the shutter casing. As a consequence, the hook detent 26 is withdrawn from engagement with the notch 27 in the annulus 13 whereupon the latter is immediately released to the action of the spring 17. As the annulus 13 begins its anti-clockwise movement under the pull of the spring 17, its lug 20 passes beneath the cam end of the finger 65 thereby actuating the same and causing the spring tail 68 to engage the contact screw 73 as shown in Figs. IV and VII with resulting closing of the circuit through the bulb 78 and the battery. At about the same time, the hook pawl 41 engages the ratchet wheel 42 to drive the gear train of the unit 47, whereby the rotation of the annulus 13 is retarded to predetermine the lapse of a definite time interval before the lug 20 encounters the sector 21 of the shutter timing means 22 as shown in Fig. V. In this way, the actuation of the shutter is delayed for the period required for the filament of the bulb 78 to burn and the illuminating material (foil) of said bulb to ignite so that the light flash is at its maximum intensity during the interval that the shutter is open. By adjusting the contact screw 73 it is possible to vary this time interval to compensate for differences in the characteristics of different shutters and of flash bulbs of various types and makes. Upon passage of the hook pawl 41 beyond the ratchet 42 during the active movement of the annulus 13, the spring 55 (which has been wound up during the actuation of the retarding unit 47), reversely drives the gear train 48—52 to restore said unit to its original condition with the stud 58 on the gear 48 engaging the stop 59. This construction insures that the extent of movement imparted to the gear train 48—52 and the time lag interval determined by it will be uniform for each actuation of the shutter mechanism.

In the modified form of circuit closing means illustrated in Figs. XII, XIII and XIV, the finger 65a is provided at its end with a pivoted cam piece 93 which is normally held in the position of Fig. XII by means of a torsion spring 94 with its edge bearing against a stop shoulder 95. The finger 65a is thus actuated by the lug 20 when the annulus 13 moves in the direction of the arrow in Fig. XII as before. During movement of the annulus 13 in the opposite direction however, the cam piece 93 will let the lug 20 pass without attendant actuation of the finger 65a. Accordingly, when the modified arrangement of Figs. XII-XIV is employed, the flash bulb 78 may be placed in its holder before the shutter is set without danger of being prematurely fired.

In the modification featured in Fig. XV, the circuit closing means is enclosed within the shutter casing along with the retarding unit 47. In this instance, the spring projection 68b is secured to the back of the finger 65b; while the contact screw 73b passes radially into the shutter casing through a block 75b of insulation secured by screws 71b to the periphery of the casing section 9. The contact screw 73b is, of course, adjustable in the block 75b and its adjustments are fixable by means of the thumb nut shown at 76b. The terminal screw 87 for the conductor 86 in the modification is threadedly engaged in a metallic bushing 77b which is set into the block 75b.

Having thus described my invention, I claim:

1. The combination with a camera lens shutter mechanism having a casing, shutter timing means, a priming means, a master control element within the casing adapted to be set by the priming means, and means for automatically moving the control element when released; of flash bulb firing mechanism comprising circuit closing means in circuit with the bulb and arranged to be actuated by the master control element, and means also actuated by the master control element whereby the movement of the latter is retarded to cause a delay interval between the instant of closing the circuit closing means and the instant of shutter opening sufficient for burning of the filament and igniting the illuminating material of the bulb.

2. The combination set forth in claim 1, in which the circuit closing means is provided with contacts capable of relative adjustment so that the delay interval may be varied to compensate for differences in the characteristics of different shutters and of different types of flash bulbs.

3. The combination set forth in claim 1, in which the circuit closing means and the retarding means of the flashing mechanism is enclosed within the casing of the lens shutter.

4. The combination set forth in claim 1, in which the circuit closing means includes a finger in the path of a projection on the master control member, and a contact element adapted to be contacted by said finger.

5. The combination set forth in claim 1, in which the circuit closing means includes a finger in the path of a projection on the master control member, and a contact element adapted to be contacted by the finger, said contact element being adjustable so that the delay interval may be varied to compensate for differences in the characteristics of different shutters and of different types of flash bulbs.

6. The combination set forth in claim 1, in which the circuit closing means includes a finger in the path of a projection on the master control member and a cooperative fixed contact element adapted to be contacted by the finger, and means to prevent actuation of the finger by the projection on the master control member when the latter is moved in the direction opposite to its operating movement.

7. The combination set forth in claim 1, in which the switch means includes a finger in the path of a projection on the master control member and a cooperative stationary contact element adapted to be contacted by the finger, said finger having an end portion capable of yielding to permit the projection on the master control member to pass when the latter is moved in the direction opposite to its operating movement to prevent actuation of the circuit closing means.

8. The combination set forth in claim 1, in which the retarding means includes a train of intermeshing gear wheels, and means on the master control for driving the gear wheels.

9. The combination set forth in claim 1, in which the master control element is moved by a spring; in which a trippable latch member holds the master control element set with the spring under tension; and in which the retarding means includes a train of gears, a ratchet wheel on the arbor of one of the wheels, a pawl on the master control element adapted to cooperate with the ratchet wheel to drive the gear train during the initial portion of the active movement of said element, a spring, tensioned during the operation of the retarding means and adapted to reversely drive said retarding means after the pawl has passed beyond the ratchet wheel, and means determining stoppage of the parts of the retarding means in their initial positions after each actuation of the shutter mechanism.

HOWARD SMALL.